(12) United States Patent
Oka et al.

(10) Patent No.: US 9,608,489 B2
(45) Date of Patent: Mar. 28, 2017

(54) ROTATING ELECTRICAL MACHINE ARMATURE

(71) Applicants: Keiichiro Oka, Chiyoda-ku (JP);
Hiroyuki Akita, Chiyoda-ku (JP);
Kunihiro Yamaoka, Chiyoda-ku (JP)

(72) Inventors: Keiichiro Oka, Chiyoda-ku (JP);
Hiroyuki Akita, Chiyoda-ku (JP);
Kunihiro Yamaoka, Chiyoda-ku (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 339 days.

(21) Appl. No.: 14/381,128

(22) PCT Filed: Feb. 15, 2013

(86) PCT No.: PCT/JP2013/053621
§ 371 (c)(1),
(2) Date: Aug. 26, 2014

(87) PCT Pub. No.: WO2013/157291
PCT Pub. Date: Oct. 24, 2013

(65) Prior Publication Data
US 2015/0022048 A1 Jan. 22, 2015

(30) Foreign Application Priority Data
Apr. 16, 2012 (JP) .................................. 2012-092551

(51) Int. Cl.
*H02K 3/18* (2006.01)
*H02K 3/52* (2006.01)
(Continued)

(52) U.S. Cl.
CPC ................. *H02K 3/28* (2013.01); *H02K 3/18* (2013.01); *H02K 3/345* (2013.01); *H02K 3/52* (2013.01);
(Continued)

(58) Field of Classification Search
CPC .. H02K 3/46; H02K 3/52; H02K 3/18; H02K 3/345; H02K 3/28; H02K 3/00;
(Continued)

(56) References Cited

U.S. PATENT DOCUMENTS 4,794,361 A * 12/1988 Young ................. H01F 27/2823
242/430
5,723,933 A * 3/1998 Grundl ..................... H02K 3/04
310/208

(Continued)

FOREIGN PATENT DOCUMENTS

CN 1581644 A 2/2005
JP 3169314 B2 3/2001
(Continued)

OTHER PUBLICATIONS

Office Action (Notice of Reasons for Rejection) issued on Sep. 15, 2015, by the Japanese Patent Office in corresponding Japanese Patent Application No. 2014-511125, and an English Translation of the Office Action. (7 pages).

(Continued)

*Primary Examiner* — Tran Nguyen
(74) *Attorney, Agent, or Firm* — Buchanan Ingersoll & Rooney PC

(57) ABSTRACT

Provided are an armature for rotary electric machine, an insulator therefor, and a coil winding device for winding a conductive wire on a tooth to which the insulator has been attached, wherein in each of all forward-wound coils and reversely-wound coils, a part wound on a first side surface (Continued)

of two side surfaces of each tooth that are opposed to the respective adjacent teeth forms a straight portion in which conductive wires in respective layers of the coil are parallel, a part wound on a second side surface forms a cross portion in which the conductive wire in an upper layer is wound in a crossed manner on the conductive wire in an adjacent lower layer, and an insulator has a guide for guiding the conductive wire along a base of an inner flange of the insulator at a first turn of each coil.

6 Claims, 12 Drawing Sheets

(51) Int. Cl.
  *H02K 3/28* (2006.01)
  *H02K 15/095* (2006.01)
  *H02K 3/34* (2006.01)
(52) U.S. Cl.
  CPC ....... *H02K 15/095* (2013.01); *H02K 2203/12* (2013.01)
(58) Field of Classification Search
  CPC .. H02K 15/095; H02K 15/0442; H02K 15/04; H01F 41/086; H01F 41/082
  See application file for complete search history.

(56) References Cited

U.S. PATENT DOCUMENTS

| | | | | |
|---|---|---|---|---|
| 7,166,949 | B2* | 1/2007 | Okada | H02K 3/522 310/194 |
| 8,093,779 | B2* | 1/2012 | Hiramatsu | H02K 3/18 310/194 |
| 2005/0006518 | A1* | 1/2005 | Becherucci | H02K 15/095 242/432.2 |
| 2005/0029891 | A1 | 2/2005 | Okada et al. | |
| 2006/0033395 | A1* | 2/2006 | Izumi | H02K 3/522 310/208 |
| 2008/0136286 | A1 | 6/2008 | Hiramatsu et al. | |

FOREIGN PATENT DOCUMENTS

| | | |
|---|---|---|
| JP | 3625185 B2 | 12/2004 |
| JP | 2005-57931 A | 3/2005 |
| JP | 2007-336757 A | 12/2007 |
| JP | 2008-148470 A | 6/2008 |
| JP | 2009-153312 A | 7/2009 |
| JP | 2011-172430 A | 9/2011 |

OTHER PUBLICATIONS

Office Action (First Notice of Reason for Rejection) issued on Apr. 1, 2016, by the Chinese Patent Office in corresponding Chinese Patent Application No. 201380014310.2, and an English Translation of the Office Action. (15 pages).

International Search Report (PCT/ISA/210) mailed on May 21, 2013, by the Japanese Patent Office as the International Searching Authority for International Application No. PCT/JP2013/053621.

* cited by examiner (a)

(b)

(c)

(a)

(b)

500

ROTATING ELECTRICAL MACHINE ARMATURE

TECHNICAL FIELD

The present invention relates to an armature for rotary electric machine, an insulator therefor, and a coil winding device.

BACKGROUND ART

Conventionally, as a coil configuration for an armature for rotary electric machine, a configuration is proposed in which a portion where a coil in a lower layer and a coil in an upper layer that are adjacent are wound in a crossed manner is located on side surfaces of each tooth, that are opposed to the adjacent teeth.

In this configuration, on such side surfaces opposed to the adjacent teeth, a coil is wound with feed by ½ pitch of the wire diameter, thereby forming a cross portion.

Thus, cross portions are located on two side surfaces of each tooth opposed to side surfaces of the adjacent teeth so that the coil shape becomes substantially a symmetrical shape, thereby obtaining a coil that is excellent in terms of assembly workability, outer appearance, and high-speed winding (for example, Patent Document 1).

However, the space factor of coil is low because conductive wires overlap at the cross portion of coils.

Considering the above, a coil configuration for an armature that cross portions of coils are collectively located on a surface on one side in the circumferential direction of each tooth, and a coil is wound in a regularly aligned manner on a side surface on the other side in the circumferential direction of each tooth, that is opposed to said tooth, is proposed as shown in Patent Document 2.

In Patent Document 2, a coil is sequentially wound in a spiral shape so as to be fed from one end to the other end in the radial direction of each tooth and then returned from the other end to the one end, and such winding is repeated, whereby cross portions are collectively located on a one-side surface of each tooth. Thus, a surface on which a conductive wire of a coil is regularly aligned and a surface on which the height of stacking is increased due to presence of cross portions are paired between the adjacent teeth, whereby the teeth compensate each other's space and high-density coils are formed.

In Patent Document 3, a coil bobbin attached to each tooth has a winding frame portion on which a conductive wire of a coil is wound, and a plurality of protrusions protruding from the winding frame portion, which are provided on at least a corner portion of an angle portion of the coil bobbin, so that a conductive wire is wound so as to be fitted into the resultant groove.

CITATION LIST

Patent Document

Patent Document 1: Japanese Patent No. 3169314 (FIGS. 1, 2, and 3)
Patent Document 2: Japanese Patent No. 3625185 (FIGS. 3, 4, and 5)
Patent Document 3: Japanese Laid-Open Patent Publication No. 2009-153312 (FIG. 5)

SUMMARY OF THE INVENTION

Problems to be Solved by the Invention

In the coil shown in Patent Document 2, a regularly-aligned surface is located on a side surface on one side in the circumferential direction of each tooth, and a cross portion of a coil is located on a side surface of the adjacent tooth, that is opposed to said surface, whereby the teeth compensate each other's space and the space factor of coil is improved.

However, it is difficult to densely wind a coil on a surface having a cross portion, and due to this, a gap occurs between conductive wires also on a side surface on which a coil is regularly wound, thereby causing a problem that unnecessary space in a coil cannot be removed.

In addition, in the case where the directions of conductive wires wound on adjacent teeth are such that forward winding and reverse winding are alternately arranged, a winding method in which two surfaces opposed to each other of the adjacent teeth are symmetrical in the right-left direction has a problem that, due to interference with a cross portion of a coil, a surface having a cross portion and a surface on which a conductive wire of a coil is regularly aligned cannot be alternately located on side surfaces opposed to each other of the adjacent teeth.

In addition, on a surface having a cross portion, the cross portion is formed by winding a coil in an opposite oblique direction relative to a coil in a lower layer. Therefore, unless a coil is carefully wound, the space factor of coil can be deteriorated.

In the placement of cross portions of coils shown in Patent Document 3, although the space factor of coil can be improved, since a winding method in which a cross portion is located on a side surface of each tooth that is an end surface in the armature axial direction is used, at the first turn of winding of a coil, a time taken to wind a conductive wire on a side surface on which a cross portion is formed is shorter than in a winding method in which a cross portion is located on a side surface opposed to the adjacent tooth.

Therefore, it is necessary to decelerate the winding speed at each time of forming a cross portion while winding a conductive wire. Thus, there is a problem that the winding speed cannot be increased and the productivity in the winding process deteriorates.

The present invention has been made to solve the above problems, and an object of the present invention is to provide an armature for rotary electric machine, an insulator therefor, and a coil winding device that can form a cross portion of a coil in an orderly manner and improve the entire space factor of coils without deteriorating the productivity in a coil winding process.

Solution to the Problems

An armature for rotary electric machine according to the present invention has a plurality of teeth provided with insulators for electric insulation, which are arranged in a ring shape, and has a coil obtained by winding a conductive wire forward or reversely in a concentrated manner on each tooth, wherein in each of all the forward-wound coils and the reversely-wound coils, a part wound on a first side surface of two side surfaces of each tooth that are opposed to the respective adjacent teeth forms a straight portion in which the conductive wires in respective layers of the coil are parallel, and a part wound on a second side surface forms a cross portion in which the conductive wire in an upper layer is wound in a crossed manner on the conductive wire in an adjacent lower layer, and a guide is provided for guiding the conductive wire along a base of a flange of each insulator at a first turn of each coil.

An insulator for armature for rotary electric machine according to the present invention is attachable to a tooth, thereby insulting a coil, and has a guide for guiding, along a base of a flange of the insulator, a first turn of a conductive wire where the coil is started to be wound.

A coil winding device according to the present invention includes: a holder section for fixing a tooth to which an insulator has been attached, the insulator having a guide for guiding a first turn of a conductive wire where a coil is started to be wound, along a base of a flange; a flyer section for winding the conductive wire on a side surface of the tooth by rotating around the tooth; and a flyer position control section for moving the flyer section in a central axis direction of the tooth just before the conductive wire in an upper layer is wound in a crossed manner on the conductive wire in an adjacent lower layer, on a side surface on which the guide is provided, of the insulator.

A coil winding device according to the present invention includes: a holder section for rotating a tooth to which an insulator has been attached, the insulator having a guide for guiding a first turn of a conductive wire where a coil is started to be wound, along a base of a flange, the holder section thereby winding the conductive wire on a side surface of the tooth; and a winding position control section configured to move in a central axis direction of the tooth just before the conductive wire in an upper layer is wound in a crossed manner on the conductive wire in an adjacent lower layer, on a side surface on which the guide is provided, of the insulator.

Effect of the Invention

In the armature for rotary electric machine according to the present invention, in each of all the forward-wound coils and the reversely-wound coils, a part wound on a first side surface of two side surfaces of each tooth that are opposed to the respective adjacent teeth forms a straight portion in which the conductive wires in respective layers of the coil are parallel, and a part wound on a second side surface forms a cross portion in which the conductive wire in an upper layer is wound in a crossed manner on the conductive wire in an adjacent lower layer, and a guide is provided for guiding the conductive wire along a base of a flange of each insulator at a first turn of each coil. Therefore, it becomes possible to accurately wind the first turn of each coil and wind the subsequent turns in an accurately regularly aligned manner.

The insulator for armature for rotary electric machine according to the present invention is attachable to a tooth, thereby insulting a coil, and has a guide for guiding, along a base of a flange of the insulator, a first turn of a conductive wire where the coil is started to be wound. Therefore, it becomes possible to accurately wind the first turn of each coil and wind the subsequent turns in an accurately regularly aligned manner.

The coil winding device according to the present invention includes: a holder section for fixing a tooth to which an insulator has been attached, the insulator having a guide for guiding a first turn of a conductive wire where a coil is started to be wound, along a base of a flange; a flyer section for winding the conductive wire on a side surface of the tooth by rotating around the tooth; and a flyer position control section for moving the flyer section in a central axis direction of the tooth just before the conductive wire in an upper layer is wound in a crossed manner on the conductive wire in an adjacent lower layer, on a side surface on which the guide is provided, of the insulator. Therefore, positioning of the cross portion can be accurately performed.

In addition, it becomes possible to suppress interference between the conductive wires or excessive interference between the conductive wire and the guide, so that the conductive wire can be regularly wound and the quality of the coil can be improved.

Further, since the cross portion is provided on a side surface opposed to the adjacent tooth, the flyer section can rotate around the tooth at high speed and can perform winding in a regularly aligned manner with high density, and also the productivity of a coil can be improved.

The coil winding device according to the present invention includes: a holder section for rotating a tooth to which an insulator has been attached, the insulator having a guide for guiding a first turn of a conductive wire where a coil is started to be wound, along a base of a flange, the holder section thereby winding the conductive wire on a side surface of the tooth; and a winding position control section configured to move in a central axis direction of the tooth just before the conductive wire in an upper layer is wound in a crossed manner on the conductive wire in an adjacent lower layer, on a side surface on which the guide is provided, of the insulator. Therefore, positioning of the cross portion can be accurately performed.

In addition, it becomes possible to suppress interference between the conductive wires or excessive interference between the conductive wire and the guide, so that the conductive wire can be regularly wound and the quality of the coil can be improved.

DESCRIPTION OF EMBODIMENTS

Embodiment 1

Hereinafter, an armature for rotary electric machine and an insulator therefor according to embodiment 1 of the present invention will be described with reference to the drawings.

Figure 1:
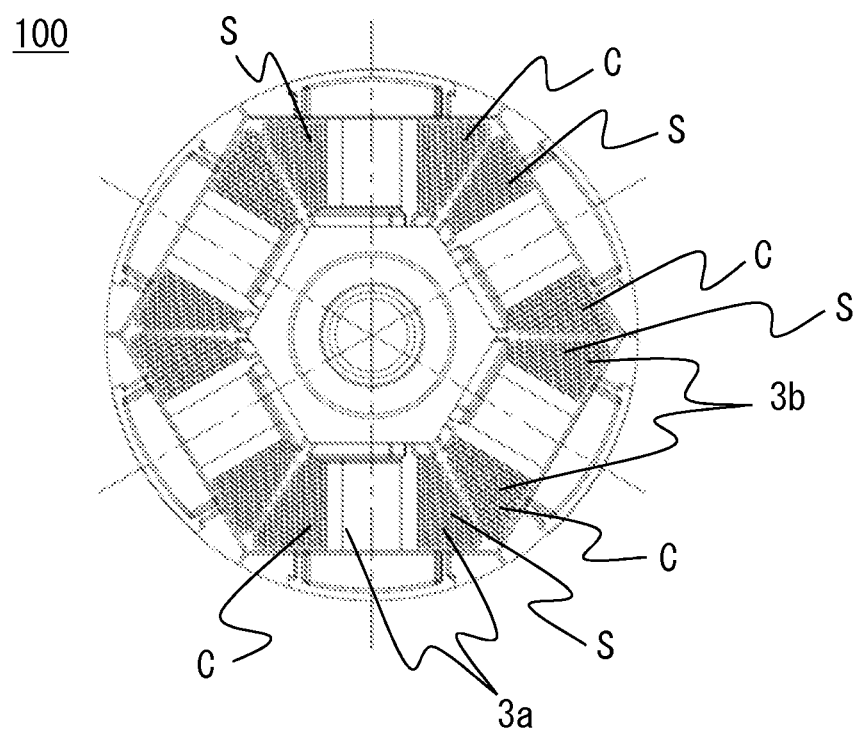
FIG. 1 is a front view of an armature for rotary electric machine according to embodiment 1 of the present invention.

FIG. 1 is a front view of an armature 100 for rotary electric machine.

Figure 2:
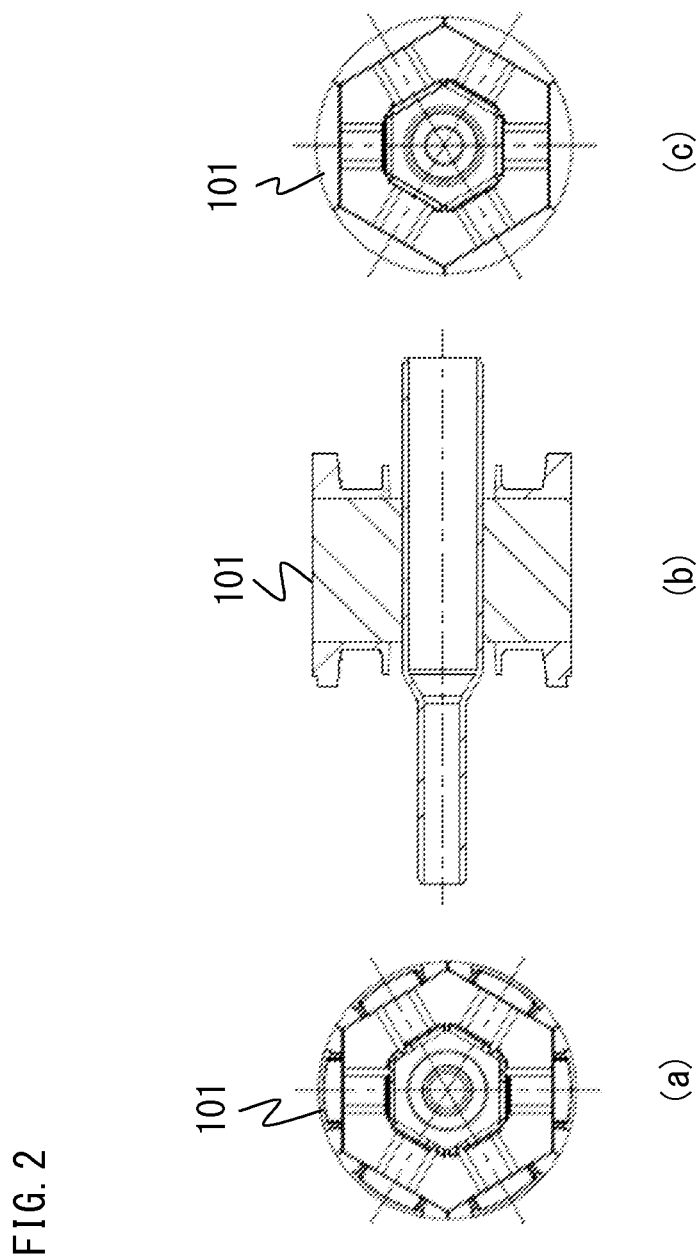
FIG. 2 is a front view, a sectional view, and a back view of a tooth assembly of the armature for rotary electric machine according to embodiment 1 of the present invention.

FIG. 2(a) is a front view of a tooth assembly 101 of the armature 100.

FIG. 2(b) is a sectional view of the tooth assembly 101 of the armature 100.

FIG. 2(c) is a back view of the tooth assembly 101 of the armature 100.

Figure 3:
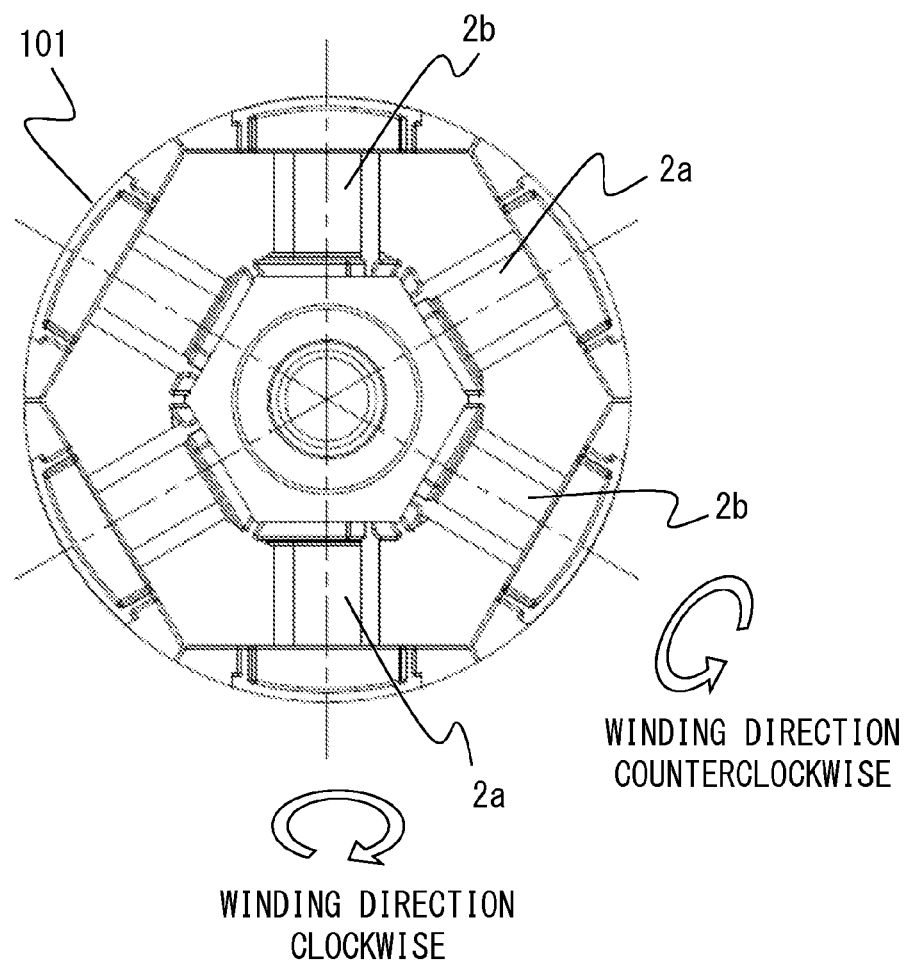
FIG. 3 is a front view of the tooth assembly of the armature for rotary electric machine according to embodiment 1 of the present invention.

FIG. 3 is an enlarged view of FIG. 2(a).

Figure 4:
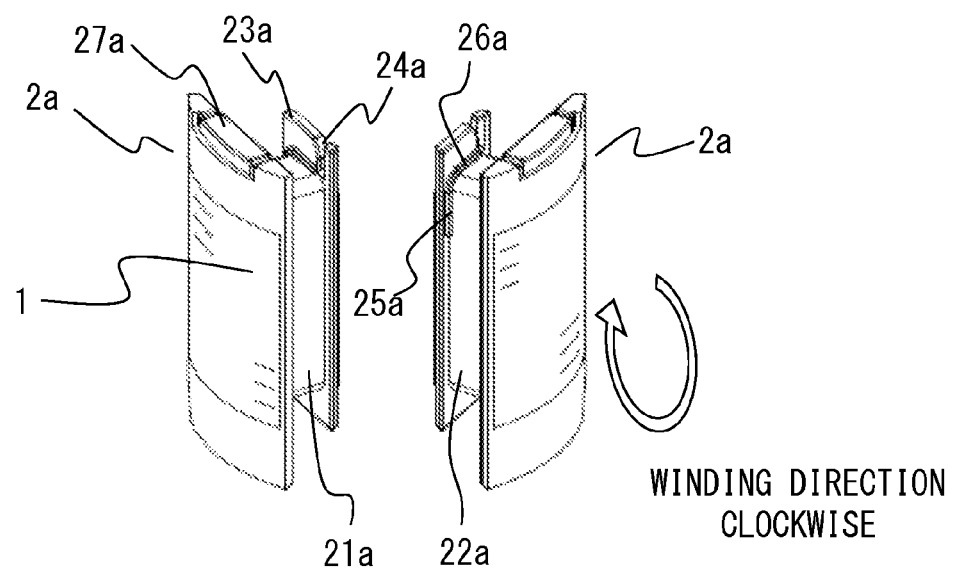
FIG. 4 is a perspective view of a clockwise-winding insulator attached to a tooth of an iron core of the armature for rotary electric machine according to embodiment 1 of the present invention, as seen from two directions.

FIG. 4 is a perspective view of a clockwise-winding insulator 2a attached to a tooth of an iron core 1 as seen from two directions.

Figure 6:
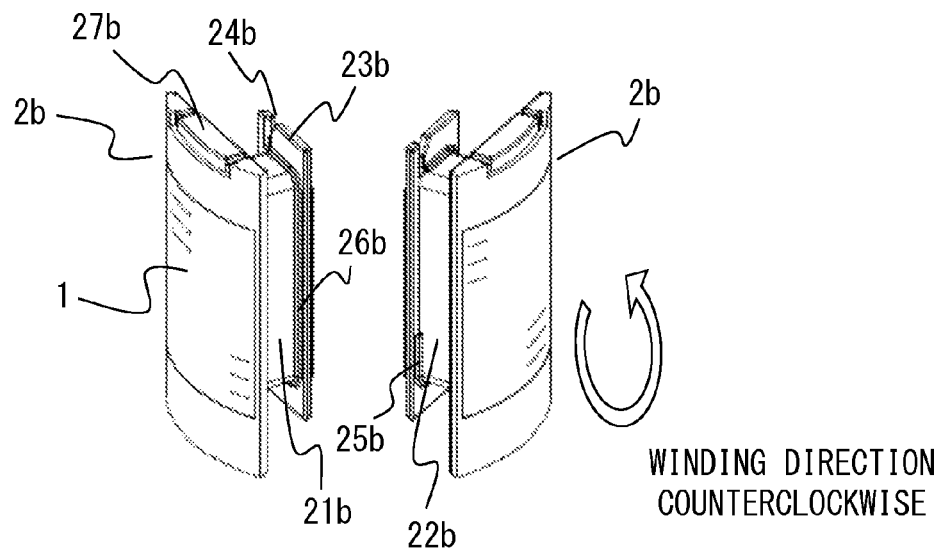
FIG. 6 is a perspective view of a counterclockwise-winding insulator attached to a tooth of the iron core of the armature for rotary electric machine according to embodiment 1 of the present invention, as seen from two directions.

FIG. 6 is a perspective view of a counterclockwise-winding insulator 2b attached to a tooth of the iron core 1 as seen from two directions.

As shown in FIG. 3, the tooth assembly 101 of the armature 100 which is a rotor is formed by attaching the clockwise-winding insulator 2a and the counterclockwise-winding insulator 2b alternately to teeth of the iron core 1 that are arranged in a ring shape.

The clockwise-winding insulator 2a and the counterclockwise-winding insulator 2b are each formed by an insulating resin.

On these insulators, coils 3a and 3b are formed in a regularly aligned manner by concentrated winding, thereby obtaining the armature 100 shown in FIG. 1.

On the tooth to which the clockwise-winding insulator 2a has been attached, as shown in FIG. 4, a conductive wire is wound clockwise (corresponding to forward winding in the scope of claims) as facing to the rotation axis.

On the tooth to which the counterclockwise-winding insulator 2b has been attached, as shown in FIG. 6, a conductive wire is wound counterclockwise (corresponding to reverse winding in the scope of claims) as facing to the rotation axis.

Of a portion of the clockwise-winding insulator 2a that covers the tooth, the right side as facing to the rotation axis from the outer circumferential side is referred to as a right side surface 21a (corresponding to a first side surface in the scope of claims), and the left side is referred to as a left side surface 22a (corresponding to a second side surface in the scope of claims).

Similarly, of a portion of the counterclockwise-winding insulator 2b that covers the tooth, the right side as facing to the rotation axis from the outer circumferential side is referred to as a right side surface 21b (corresponding to a first side surface in the scope of claims), and the left side is referred to as a left side surface 22b (corresponding to a second side surface in the scope of claims).

Next, the configurations of the clockwise-winding insulator 2a and the counterclockwise-winding insulator 2b, and the process of forming the coil 3a and the coil 3b by winding conductive wires on the teeth provided with these insulators will be described.

FIG. 8(a) is right and left side views of the iron core to which the clockwise-winding insulator 2a has been attached.

FIG. 8(b) is a view showing winding in the first layer of the coil 3a on the tooth of the iron core to which the clockwise-winding insulator 2a has been attached.

FIG. 8(c) is a view showing winding in the second layer of the coil 3a on the tooth of the iron core to which the clockwise-winding insulator 2a has been attached.

Figure 15:
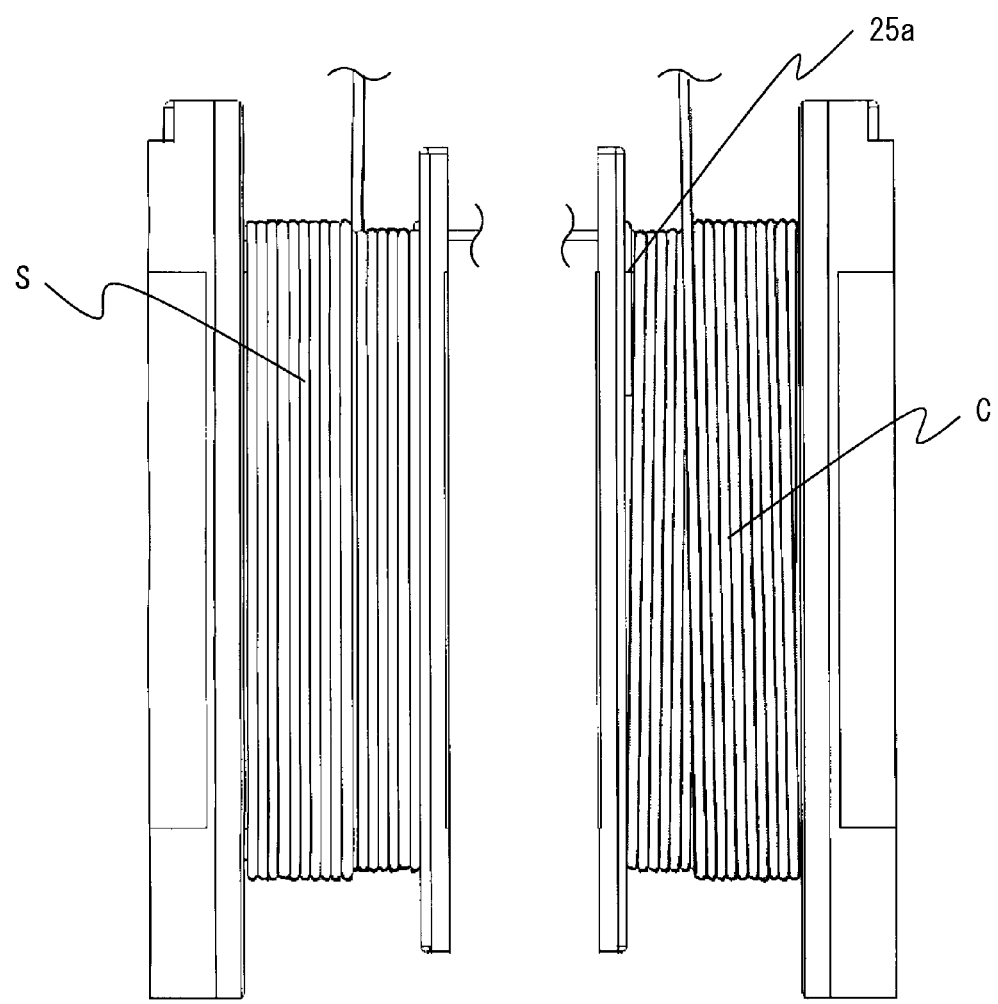
FIG. 15 is an enlarged view of winding in the second layer of the coil shown in FIG. 8.

FIG. 15 is an enlarged view of FIG. 8(c).

Figure 5:
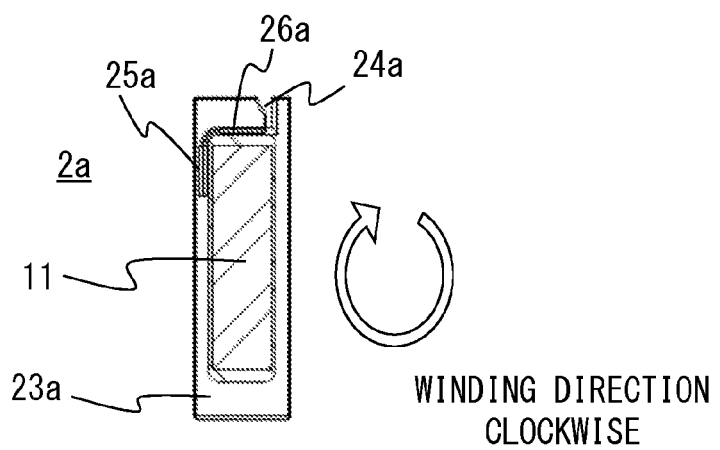
FIG. 5 is a sectional view as cut at a tooth center portion of the iron core to which the clockwise-winding insulator shown in FIG. 4 has been attached.

FIG. 5 is a sectional view of the clockwise-winding insulator 2a as cut at a center portion of a tooth 11.

FIG. 9(a) is right and left side views of the iron core to which the counterclockwise-winding insulator 2b has been attached.

FIG. 9(b) is a view showing winding in the first layer of the coil 3b on the tooth of the iron core to which the counterclockwise-winding insulator 2b has been attached.

Figure 7:
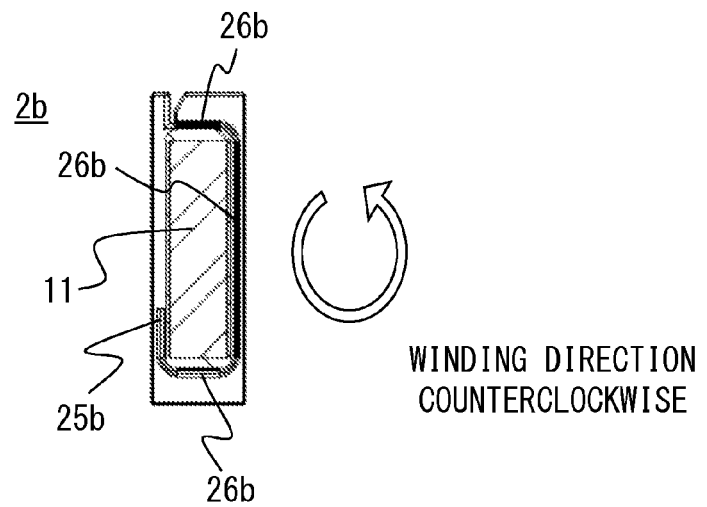
FIG. 7 is a sectional view as cut at a tooth center portion of the iron core to which the counterclockwise-winding insulator shown in FIG. 6 has been attached.

FIG. 7 is a sectional view of the counterclockwise-winding insulator 2b as cut at a center portion of a tooth 11.

Hereinafter, for convenience of description, when the term "above", "upper", "below", "lower", or the like is simply mentioned, such a term indicates each direction or location in each drawing unless otherwise specified.

At the upper right end of an inner flange 23a of the clockwise-winding insulator 2a shown in FIG. 4, an introduction opening 24a is provided through which a conductive wire 4 to be wound on the tooth 11 to which the clockwise-winding insulator 2a has been attached is introduced from the outside.

In addition, at the inner-side upper end in the rotation axis direction, of the left side surface 22a, i.e., at the upper end of a portion corresponding to the base of the inner flange 23a, a cross guide 25a having the same width as the outer diameter of the conductive wire 4 is provided being formed integrally with the clockwise-winding insulator 2a.

The cross guide 25a is used for obliquely guiding the initial first turn of the conductive wire 4 of the coil 3a to be wound on the clockwise-winding insulator 2a.

From the upper end of the cross guide 25a, at the base of the inner flange 23a on the upper end surface of the tooth portion of the clockwise-winding insulator 2a, a dummy guide 26a is provided for filling a gap between the initial first turn of the conductive wire 4 of the coil 3a and the inner flange 23a.

Next, the procedure of actually winding a coil on the clockwise-winding insulator 2a will be described.

First, the conductive wire 4 is introduced through the introduction opening 24a of the inner flange 23a from the rotation axis side of the armature 100.

Then, along the base of the inner flange 23a, the initial first turn of the conductive wire 4 is wound rightward in FIG. 5.

At this time, as shown in FIG. 8(b), the first turn of the conductive wire 4 is wound closely along the inner flange 23a from the right side surface 21a.

Then, after having been wound along the inner flange 23a to reach the lower portion of the left side surface 22a, the conductive wire 4 is obliquely guided from the lower end of the left side surface 22a so as to be separated from the base of the inner flange 23a, along the right side of the cross guide 25a in FIG. 8(b).

Thereafter, the conductive wire 4 is wound along the dummy guide 26a.

At the second and subsequent turns, the conductive wire 4 is guided by the previously wound part thereof, to form the first layer of the regularly aligned coil 3a.

In the first layer of the coil 3a thus wound, on the right side surface 21a, the wire is wound in parallel to the inner flange 23a and straightly at every turn, to reach the base of an outer flange 27a of the clockwise-winding insulator 2a.

Then, when having returned at the base of the outer flange 27a, on the right side surface 21a, the conductive wire 4 is stacked in a trefoil formation on the middle between wires of the coil 3a in the first layer, thereby forming the second layer of the coil 3a.

Thus, on the right side surface 21a, the coil 3a is wound so as to be regularly aligned in parallel to the inner flange 23a and the outer flange 27a at every turn, thereby forming a straight portion S of the coil 3a as shown in FIG. 8(c).

On the other hand, on the left side surface 22a, in the first layer of the coil 3a, every turn of wire is wound obliquely along the first turn of the conductive wire 4 that has been wound obliquely with respect to the inner flange 23a, to reach the base of the outer flange 27a.

Then, when having returned at the base of the outer flange 27a, as shown in FIG. 8(c), on the left side surface 22a, the conductive wire 4 is stacked in the upper layer so as to cross in the opposite oblique direction relative to the coil 3a in the first layer, thereby forming a cross portion C and thus forming the second layer of the coil 3a.

Thus, on the left side surface 22a, at every turn, the coil 3a is wound in a regularly aligned manner such that the wires in the upper and lower adjacent layers cross each other, obliquely with respect to the inner flange 23a and the outer flange 27a.

Next, the counterclockwise-winding insulator 2b will be described.

At the upper left end of an inner flange 23b of the counterclockwise-winding insulator 2b shown in FIG. 6, an introduction opening 24b is provided through which a conductive wire 4 to be wound on the tooth 11 to which the counterclockwise-winding insulator 2b has been attached is introduced from the outside.

In addition, at the inner-side lower end in the rotation axis direction, of the left side surface 22b, i.e., at the lower end of a portion corresponding to the base of the inner flange 23b, a cross guide 25b is provided being formed integrally with the counterclockwise-winding insulator 2b.

The cross guide 25b is used for obliquely guiding the initial first turn of the conductive wire 4 of the coil 3b to be wound on the counterclockwise-winding insulator 2b.

From the lower end of the cross guide 25b, along the base of the inner flange 23b of the counterclockwise-winding insulator 2b excluding the left side surface 22b, a dummy guide 26b having the same width as the outer diameter of the conductive wire 4 is provided for filling a gap between the initial first turn of the conductive wire 4 of the coil 3b and the inner flange 23b.

Figure 9:
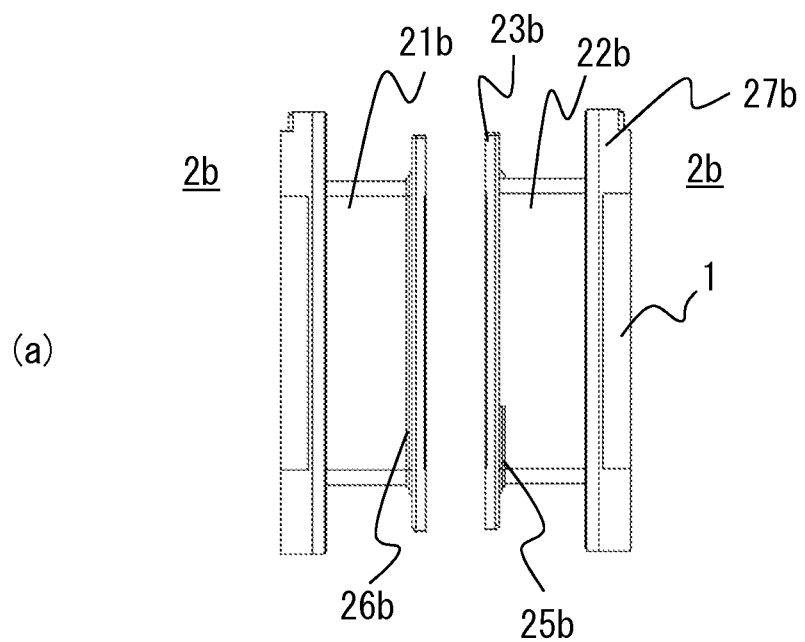
FIG. 9 is right and left side views of the iron core to which the counterclockwise-winding insulator shown in FIG. 6 has been attached, in which winding in the first layer of a coil is shown.
Figure 9:
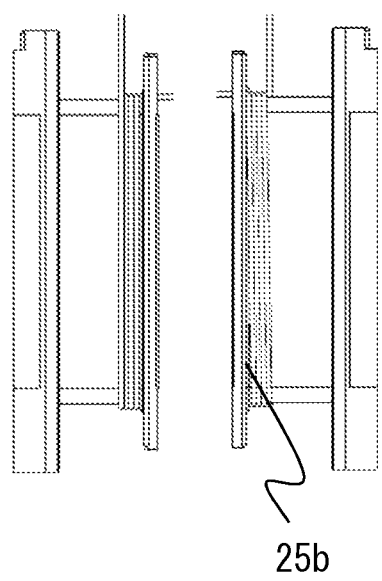

Next, the procedure of winding a coil on the counterclockwise-winding insulator 2b will be described based on FIGS. 6, 7, and 9.

First, the conductive wire 4 is introduced through the introduction opening 24b of the inner flange 23b from the rotation axis side of the armature.

Then, along the base of the inner flange 23b, the initial first turn of the conductive wire 4 is wound leftward in FIG. 7.

At this time, as shown in FIG. 9(b), from a position in close contact with the inner flange 23b at the upper portion of the left side surface 22b, the first turn of the conductive wire 4 is obliquely guided so as to be separated from the base of the inner flange 23b, along the right side of the cross guide 25b in FIG. 9(b).

Then, after having been wound to reach the lower portion of the left side surface 22b, the conductive wire 4 is wound in parallel to the inner flange 23b along the dummy guide 26b which has the same width as the cross guide 25b and is provided in a range from the lower end of the cross guide 25b through the tooth lower end surface and the right side surface 21b to the introduction opening 24b on the tooth upper surface along the base of the inner flange 23b.

At the second and subsequent turns, the conductive wire 4 is guided by the previously wound part thereof, to form the first layer of the regularly aligned coil 3b.

In the first layer of the coil 3b thus wound, on the right side surface 21b, the wire is wound in parallel to the inner flange 23b and straightly at every turn, to reach the base of an outer flange 27b of the counterclockwise-winding insulator 2b.

Then, when having returned at the base of the outer flange 27b, on the right side surface 21b, the conductive wire 4 is stacked in a trefoil formation on the middle between wires of the coil 3b in the first layer, thereby forming the second layer of the coil 3b.

Thus, on the right side surface 21b, the coil 3b is wound so as to be regularly aligned in parallel to the inner flange 23b and the outer flange 27b at every turn, thereby forming a straight portion S of the coil 3b.

On the other hand, on the left side surface 22b, in the first layer of the coil 3b, every turn of wire is wound obliquely along the first turn of the conductive wire 4 that has been wound obliquely with respect to the inner flange 23b, to reach the base of the outer flange 27b.

Then, when having returned at the base of the outer flange 27b, on the left side surface 22b, the conductive wire 4 is stacked in the upper layer so as to cross in the opposite oblique direction relative to the coil 3b in the first layer, thereby forming a cross portion C and thus forming the second layer of the coil 3b.

Thus, on the left side surface 22b, at every turn, the coil 3b is wound in a regularly aligned manner such that the wires in the upper and lower adjacent layers cross each other, obliquely with respect to the inner flange 23b and the outer flange 27b.

As described above, the armature 100 shown in FIG. 1 has the coils 3a and 3b wound in a regularly aligned manner by concentrated winding in alternately opposite directions, and the coils 3a and 3b respectively have cross portions C on the left side surface 22a and 22b sides in the circumferential direction of the teeth as facing to the central axis from the outer circumference of the armature 100, and have straight portions S having regular and parallel windings on the right side surfaces 21a and 21b.

In the case where a winding coil is regularly aligned at ½ pitch in a trefoil formation, a stacking height H1 to the n-th layer is represented as H1=d+(n−1)×0.866d, where φd is the coil diameter. On the other hand, a stacking height H2 at the cross portion is represented as H2=n×d. Thus, the winding density decreases at the cross portion.

Considering this, the configuration of each coil of the armature 100 is made such that the straight portion and the cross portion of the adjacent coils 3a and 3b are opposed to each other, whereby winding spaces can be effectively used, and as a result, the number of turns of the coils 3a and 3b can be increased or the coil outer diameter can be enlarged.

Thus, the coils 3a and 3b can be wound in a balanced manner.

The armature and the insulator therefor according to embodiment 1 of the present invention make it possible to accurately wind the first turn of each coil, thereby enabling the subsequent turns to be wound in a regularly aligned manner with high accuracy.

Particularly, owing to the cross guide, a coil on a side surface of each tooth on which the cross portion is formed can be obliquely wound with high accuracy, so that winding disturbance at the cross portion can be prevented and a coil with a high space factor can be obtained.

In addition, owing to the dummy guide connected to the cross guide, even in the case where the first turn of coil is started to be wound from a side surface of a tooth on which the cross portion is formed, a coil at the straight portion formed on the opposite surface can be accurately and straightly wound in parallel to the inner flange and the outer flange of the insulator.

It is noted that in order to obtain the effect of the present invention, the combination of clockwise winding and counterclockwise winding of coils and the combination of side surfaces on which the cross portion and the straight portion are located, may be reversed.

Embodiment 2

Hereinafter, a cross guide provided on an insulator of an armature for rotary electric machine according to embodiment 2 of the present invention will be described with reference to the drawings.

Figure 10:
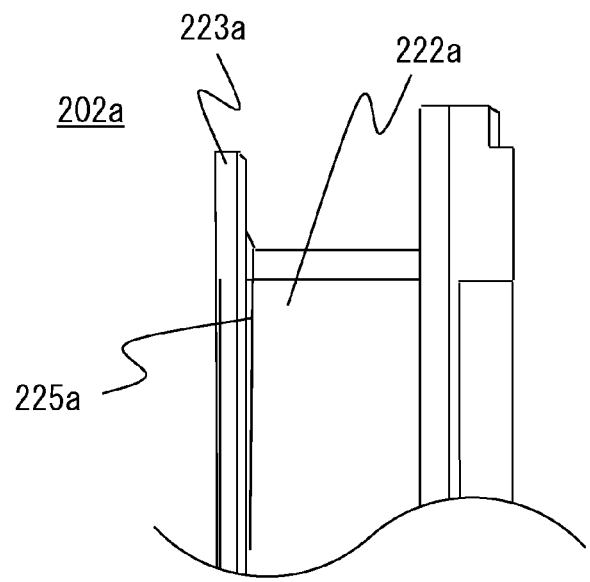
FIG. 10 is a view showing a major part of a left side surface of a clockwise-winding insulator attached to a tooth of an iron core of an armature for rotary electric machine according to embodiment 2 of the present invention.

FIG. 10 is a view showing a major part of a left side surface 222a of a clockwise-winding insulator 202a attached to a tooth of an iron core of the armature for rotary electric machine according to embodiment 2 of the present invention.

In embodiment 1, the cross guides 25a and 25b have the same width as the outer diameter of the conductive wire 4.

In the present embodiment, a cross guide 225a is formed such that the width at the end of the left side surface, that is closest to the upper surface of a tooth is the same as the outer diameter of the conductive wire 4, and the shape is gradually tapered as approaching to the lower side, so as to fill a space between the conductive wire 4 to be obliquely wound and an inner flange 223a.

The first turn of a coil to be obliquely wound is wound accurately along the cross guide 225a, whereby every turn of the coil can be accurately wound along each turn just previous thereto.

It is noted that the cross guide 225a may be provided across the entire length in the up-down direction on the left side surface, or may be partially provided.

Embodiment 3

Hereinafter, an armature 300 for rotary electric machine according to embodiment 3 of the present invention will be described with reference to the drawings.

Figure 11:
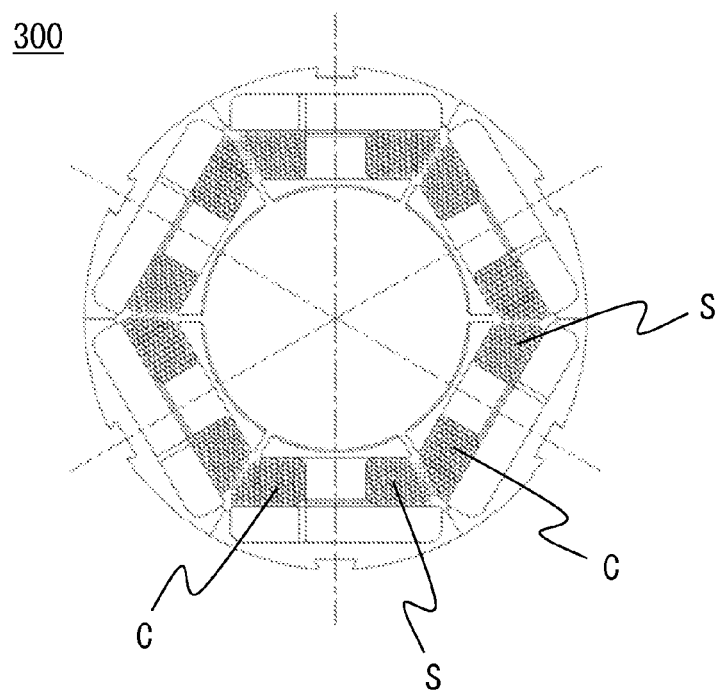
FIG. 11 is a front view of an armature for rotary electric machine according to embodiment 3 of the present invention.

FIG. 11 is a front view of the armature 300 which is a stator.

The configuration of the present invention is effective to a coil in the case where a cross portion is accurately formed, and this applies whether the type of armature is a rotor or a stator.

In the case of stator, the configuration is the same as in embodiment 1, except that the first turn of coil starts from the outer circumferential side of each tooth.

It is noted that as shown in FIGS. 1 and 11, the present invention is applicable to a rotor or a stator of an armature.

Particularly, in the case of a rotor or a stator having an even number of teeth on which coils formed by a conductive wire being forward wound in a concentrated manner and coils formed by a conductive wire being reversely wound in a concentrated manner are alternately located, one of side surfaces opposed to each other of the adjacent teeth is a surface on which a cross portion C is formed, and the other side surface is a surface on which a straight portion S is formed.

Therefore, on side surfaces opposed to each other of the adjacent teeth, a surface on which a cross portion C is formed and a surface on which a straight portion S is formed are alternately located.

In addition, each iron core of a rotor and a stator may be an integrated iron core or a divided iron core.

Also in the present embodiment, at a part where coils wound on the adjacent teeth are opposed to each other, a cross portion of one of the coils and a straight portion of the other coil are opposed to each other, so that the coils can be accurately wound with a high space factor.

In addition, on side surfaces opposed to each other of the adjacent teeth, a surface on which a cross portion is formed and a surface on which a straight portion is formed are alternately located, whereby the effect of improving the space factor of coils can be maximally exerted, and the productivity can also be assured by performing high-speed winding.

Embodiment 4

Hereinafter, a coil winding device 400 according to embodiment 4 of the present invention will be described with reference to the drawings.

Figure 12:
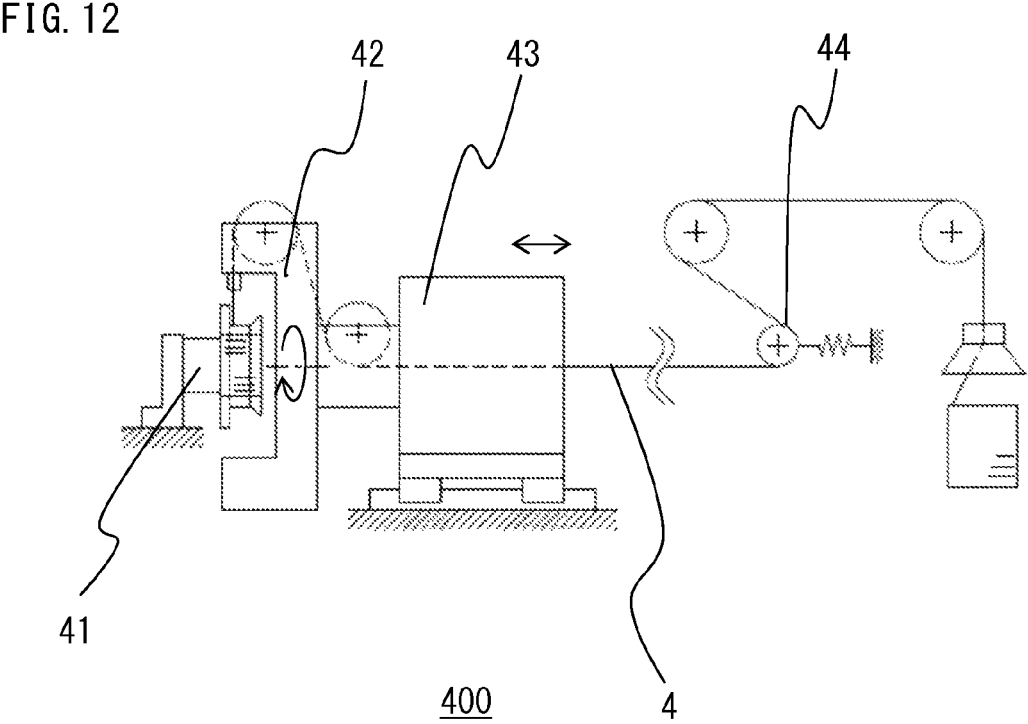
FIG. 12 is a view showing the configuration of a coil winding device according to embodiment 4 of the present invention.

FIG. 12 is a diagram showing the configuration of the coil winding device 400.

The coil winding device 400 is a device for forming a coil by winding the conductive wire 4 on the tooth 11 to which the clockwise-winding insulator or the counterclockwise-winding insulator has been attached.

The coil winding device 400 is composed of a tensioner section 44, a flyer position control section 43, a flyer section 42, and a holder section 41.

The tensioner section 44 adjusts the conductive wire 4 so as not to be loosened.

The flyer position control section 43 is movable in the central axis direction of the tooth 11 and controls the position of the flyer section 42 relative to the tooth 11.

The details of the control of the position of the flyer section 42 will be described later.

The flyer section 42 rotates around the tooth 11, to wind the conductive wire 4 on side surfaces of the tooth 11.

The holder section 41 fixes the tooth 11.

Next, the operation of the coil winding device 400 winding the conductive wire 4 on the tooth 11 to which the clockwise-winding insulator 2a has been attached will be described with reference to FIGS. 4, 5, 8 and 12.

At the start of winding a coil, the conductive wire 4 wound on a bobbin passes through the tensioner section 44 and then the flyer position control section 43, and then is fastened on the outside of the introduction opening 24a of the inner flange 23a of the insulator.

The flyer position control section 43 adjusts the position of the flyer section 42 so that the tip end of a nozzle comes to a position (the introduction opening 24a of the inner flange 23a of the insulator in FIG. 4) where the initial first turn of the conductive wire 4 is started to be wound.

Next, the flyer section 42 starts to rotate from the upper portion of the right side surface 21a in the circumferential direction of the tooth 11 (rightward in FIG. 5), to start to wind the conductive wire 4 on the right side surface 21a.

As the flyer section rotates to the lower portion of the left side surface 22a, on the right side surface 21a, the conductive wire 4 is wound closely along the inner flange 23a as shown in FIG. 8(b).

Further, as the flyer section 42 rotates from the lower portion of the left side surface 22a to the upper end surface of a tooth portion of the clockwise-winding insulator 2a (hereinafter, referred to as the upper end surface of the tooth portion), the conductive wire 4 is wound along the cross guide 25a and the dummy guide 26a.

At the second and subsequent turns, the conductive wire 4 is wound along the previously wound part thereof, to reach the outer flange 27a, thereby forming the first layer of the coil 3a.

Next, the operation of winding the conductive wire 4 in the second layer of the coil 3a will be described.

At the final turn in the first layer of the coil 3a, when the conductive wire 4 has been wound to reach the corner at the lower end of the left side surface 22a, the flyer position control section 43 moves the position of the flyer section 42 forward in the central axis direction of the tooth by a predetermined width, just before the flyer section 42 rotates from the corner at the lower end of the left side surface 22a to start winding in the second layer.

Then, as the flyer section 42 rotates to the corner at the upper end of the tooth portion, the conductive wire 4 is wound in a crossed manner on the first layer of the coil 3a in the opposite oblique direction as shown in FIG. 8(c).

Then, as the flyer section 42 further rotates to the lower portion of the right side surface 21a, the conductive wire 4 is wound on the middle between wires of the coil 3a in the first layer.

As described above, on the right side surface 21a, the second layer of the coil 3a stacked in a trefoil formation is formed, and on the left side surface 22a, the second layer of the coil 3a is formed so as to form a cross portion C where the coil 3a is stacked in the upper layer so as to cross in the opposite oblique direction relative to the coil 3a in the first layer.

Thus, also in the second and subsequent layer, the wire is wound in the same manner, to form the coil 3a.

Next, the operation of the coil winding device 400 winding the conductive wire 4 on the tooth 11 to which the counterclockwise-winding insulator 2b has been attached will be described with reference to FIGS. 6 and 7.

As compared to the case of attaching the clockwise-winding insulator 2a, the operation is different in that the positions of the cross guide 25b and the dummy guide 26b are as shown in FIG. 7, the rotation direction of the flyer section 42 is leftward in the FIG. 7, and the conductive wire 4 is wound from a surface on which a cross portion is formed.

Although being different in the above points, the operation is the same in that as the flyer section 42 rotates leftward in FIG. 7, on the left side surface 22b, the conductive wire 4 is wound along the cross guide 25b and the dummy guide 26b, and then, as the flyer section 42 further rotates, on the right side surface 21b, the conductive wire 4 is wound closely along the inner flange 23b.

In addition, the operation of the flyer position control section 43 when a cross portion on the left side surface 22b is formed in the second layer is also the same, so that the flyer position control section 43 moves the position of the flyer section 42 forward in the tooth central axis direction by a predetermined width, just before the flyer section 42 rotates from the upper end surface of a tooth portion to start winding in the second layer.

In addition, even in the case where the armature is a stator, the operation is the same except that the first turn starts from the outer circumferential side of a tooth.

Next, a time taken to wind the conductive wire 4 in the case of providing the cross portion C on a side surface of each tooth that is an end surface in the armature axial direction, and a time taken to wind the conductive wire 4 in the case of providing the cross portion C on a side surface opposed to the adjacent tooth, will be described.

Figure 13:
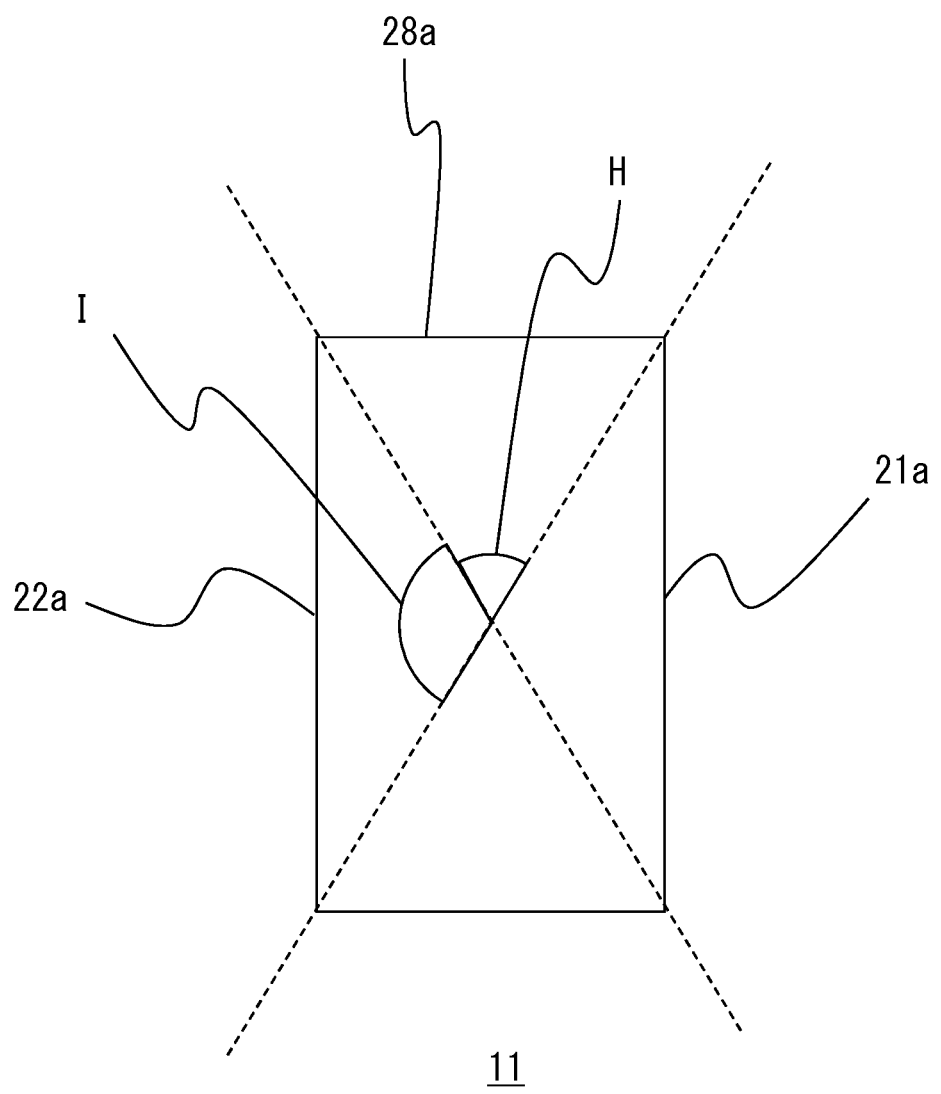
FIG. 13 is a sectional view of a tooth according to embodiment 4 of the present invention.

FIG. 13 is a sectional view of the tooth 11 along a direction perpendicular to the armature radial direction.

A side surface of the tooth that is an end surface in the armature axial direction is defined as an upper end surface 28a.

In FIG. 13, the angle between two diagonal lines of the tooth 11 will be focused on.

The angle between two diagonal lines of the tooth 11, that faces to the upper end surface 28a is defined as an angle H.

The angle between two diagonal lines of the tooth 11, that faces to the left side surface 22a is defined as an angle I.

A time taken to wind the conductive wire 4 on a side surface of the tooth 11 is proportional to the magnitude of an angle facing to the side surface. Therefore, the greater the angle is, the longer the time taken to wind the conductive wire 4 on the side surface is.

That is, since the angle I is greater than the angle H, under the condition that the conductive wire 4 is wound at the same rotation speed, in the case of providing the cross portion C on the left side surface 22a, the cross portion C can be formed taking a longer time than in the case of providing the cross portion C on the upper end surface 28a.

Therefore, it is not necessary to decelerate the speed of winding of the conductive wire 4 at each time of forming the cross portion C, and the rotation speed of the flyer section 42 can be made constant.

Thus, the productivity in the winding process is improved.

As described above, in the coil winding device 400 according to embodiment 4 of the present invention, the flyer position control section moves the position of the flyer section in the central axis direction of a tooth just before winding of the conductive wire in a cross manner, whereby positioning of the cross portion can be accurately performed.

In addition, it becomes possible to suppress interference between conductive wires or excessive interference between a conductive wire and a guide, so that a conductive wire can be regularly wound and the quality of a coil can be improved.

In addition, since the cross guide and the dummy guide are provided on the insulator, a conductive wire is wound along these guides as the flyer section rotates, whereby the conductive wire can be wound further regularly.

In addition, since a cross portion is provided on a side surface opposed to the adjacent tooth, the flyer section can rotate around the tooth at high speed and can perform winding in a regularly aligned manner with high density, and also the productivity of a coil can be improved.

Embodiment 5

Hereinafter, a coil winding device 500 according to embodiment 5 of the present invention will be described about a difference from embodiment 4, with reference to the drawings.

Figure 14:
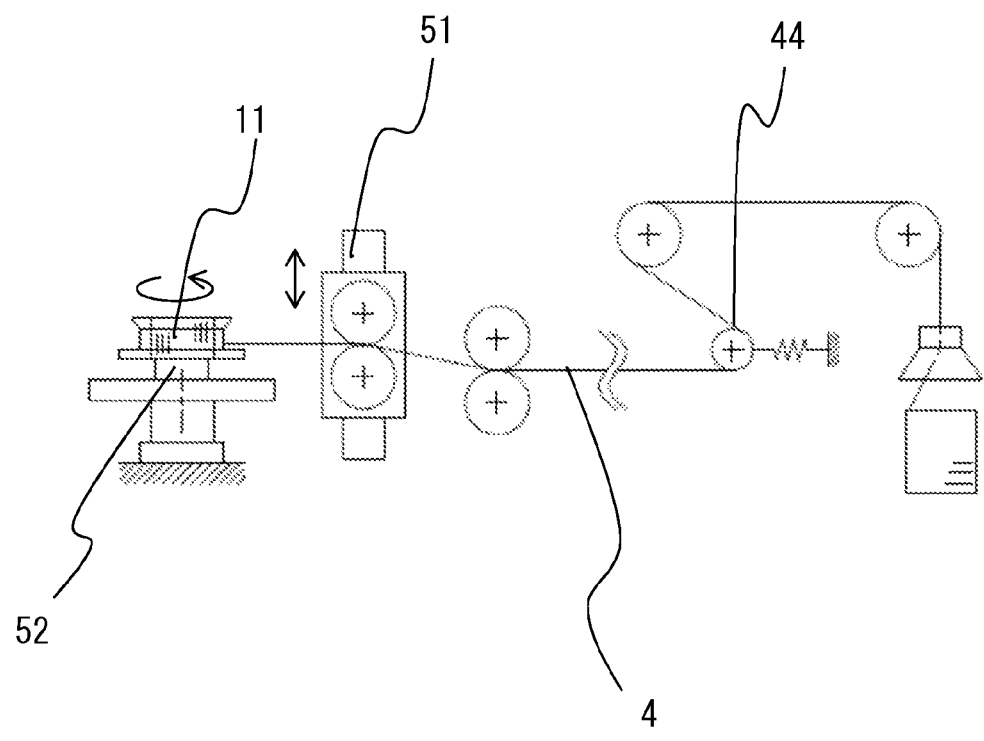
FIG. 14 is a view showing the configuration of a coil winding device according to embodiment 5 of the present invention.

FIG. 14 is a diagram showing the configuration of the coil winding device 500.

The coil winding device 500 is a device for forming a coil by winding the conductive wire 4 on the tooth 11 to which the clockwise-winding insulator or the counterclockwise-winding insulator has been attached.

The coil winding device 500 is composed of the tensioner section 44, a winding position control section 51, and a holder section 52.

The tensioner section 44 adjusts the conductive wire 4 so as not to be loosened.

The winding position control section 51 is movable in the central axis direction of the tooth 11 and controls the position of the wire when the conductive wire 4 is wound on the tooth 11.

The details of the control of the position of the wire will be described later.

The holder section 52 rotates the tooth 11, to wind the conductive wire 4 on side surfaces of the tooth 11.

Figure 8:
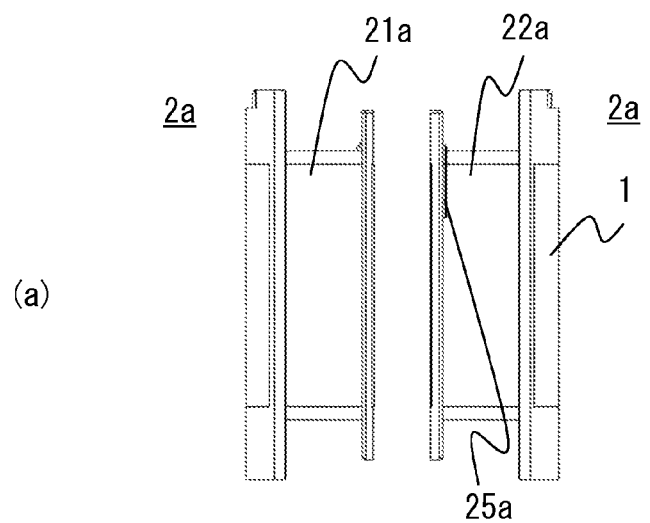
FIG. 8 is right and left side views of the iron core to which the clockwise-winding insulator shown in FIG. 4 has been attached, in which winding of a coil is shown.
Figure 8:
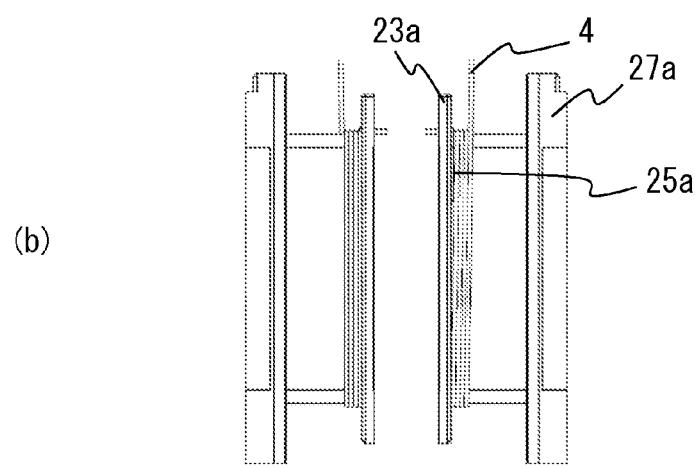
Figure 8:
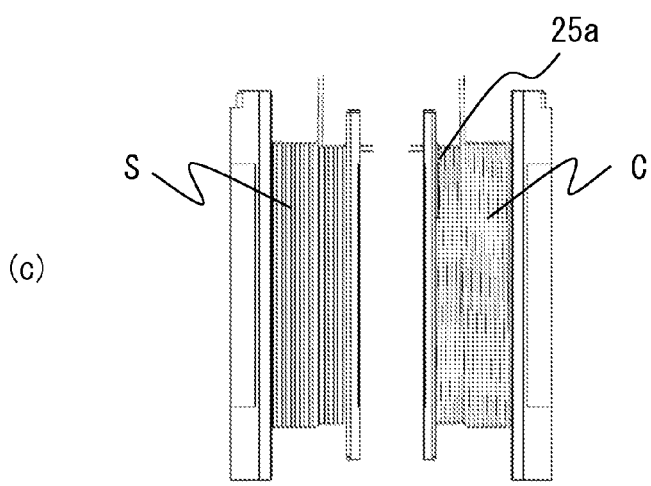

Next, the operation of the coil winding device 500 winding the conductive wire 4 on the tooth 11 will be described about a difference from embodiment 4, with reference to FIGS. 4 and 8.

In embodiment 4, the flyer section 42 rotates around the tooth 11, thereby winding the conductive wire 4 on side surfaces of the tooth 11.

In the present embodiment, the holder section 52 rotates the tooth 11, thereby winding the conductive wire 4 on side surfaces of the tooth 11.

The winding position control section 51 corresponds to the flyer position control section 43 of embodiment 4.

On the left side surface 22a in FIG. 4, the winding position control section 51 moves in the central axis direction of the tooth 11 by a predetermined width just before the holder section 52 rotates to wind the conductive wire 4.

Then, as the holder section 52 rotates, the conductive wire 4 is wound so as to cross in the opposite oblique direction on the first layer of the coil 3a as shown in FIG. 8(c).

As described above, in the coil winding device 500 according to embodiment 5 of the present invention, the same effect as in embodiment 4 is provided, and also, the winding position control device moves the position of the wire when the conductive wire is wound on a tooth, in the central axis direction of the tooth, just before winding of the conductive wire in the crossed manner, whereby positioning of the cross portion can be accurately performed.

In addition, it becomes possible to suppress interference between conductive wires or excessive interference between a conductive wire and a guide, so that a conductive wire can be regularly wound and the quality of a coil can be improved.

In addition, since the cross guide and the dummy guide are provided on the insulator, a conductive wire is wound along these guides as the holder section rotates, whereby the conductive wire can be wound further regularly.

It is noted that, within the scope of the present invention, the above embodiments may be freely combined with each other, or each of the above embodiments may be modified or abbreviated as appropriate.

The invention claimed is:

1. An armature for rotary electric machine, having an even number of teeth provided with insulators for electric insulation, which are arranged in a ring shape, and having a coil obtained by winding a conductive wire forward in a concentrated manner and a coil obtained by winding a conductive wire reversely in a concentrated manner on each tooth, wherein in each of all the forward-wound coils and the reversely-wound coils, a part wound on a first side surface of two side surfaces of each tooth that are opposed to the respective adjacent teeth forms a straight portion, in which straight portion the conductive wires in respective layers of the coil are parallel, and a part wound on a second side surface forms a cross portion, in which cross portion the conductive wire in an upper layer is wound in a crossed manner on the conductive wire in an adjacent lower layer, a guide is provided for guiding the conductive wire along a base of a flange of each insulator at a first turn of each coil, wherein the coil obtained by winding the conductive wire forward in a concentrated manner and the coil obtained by winding the conductive wire reversely in a concentrated manner on the teeth are alternately arranged such that two side surfaces opposed to each other of the adjacent teeth are the first side surface and the second side surface, the guide is a cross guide for guiding the first turn of the conductive wire to be wound on the second side surface, obliquely with respect to an axial direction of the armature, and the cross guide is provided at an end portion where the first turn of winding is ended, of the insulator on the second side surface.

2. An armature for rotary electric machine, having an even number of teeth provided with insulators for electric insulation, which are arranged in a ring shape, and having a coil obtained by winding a conductive wire forward in a concentrated manner and a coil obtained by winding a conductive wire reversely in a concentrated manner on each tooth, wherein in each of all the forward-wound coils and the reversely-wound coils, a part wound on a first side surface of two side surfaces of each tooth that are opposed to the respective adjacent teeth forms a straight portion, in which straight portion the conductive wires in respective layers of the coil are parallel, and a part wound on a second side surface forms a cross portion, in which cross portion the conductive wire in an upper layer is wound in a crossed manner on the conductive wire in an adjacent lower layer, a guide is provided for guiding the conductive wire along a base of a flange of each insulator at a first turn of each coil, wherein the coil obtained by winding the conductive wire forward in a concentrated manner and the coil obtained by winding the conductive wire reversely in a concentrated manner on the teeth are alternately arranged such that two side surfaces opposed to each other of the adjacent teeth are the first side surface and the second side surface, the guide is a cross guide for guiding the first turn of the conductive wire to be wound on the second side surface, obliquely with respect to an axial direction of the armature, and the guide is composed of the cross guide, and a dummy guide, connected to the cross guide, for guiding the conductive wire in parallel to a flange of the insulator on at least a part of surfaces other than the second side surface of each tooth.

3. The armature for rotary electric machine according to claim 1, wherein the guide has a shape that fills at least a part of a gap between the first turn of the wire and the insulator.

4. The armature for rotary electric machine according to claim 1, wherein the flange of the insulator is an inner flange in the case where the armature is a rotor.

5. The armature for rotary electric machine according to claim 1, wherein a length of each tooth in an axial direction of the armature is greater than a length of the tooth in a circumferential direction of the armature.

6. The armature for rotary electric machine according to claim 1, wherein the flange of the insulator is an outer flange in the case where the armature is a stator.

* * * * *